G. BOSMAJIAN.
TREE LIMB SUPPORT.
APPLICATION FILED AUG. 23, 1920.
1,389,932.
Patented Sept. 6, 1921.
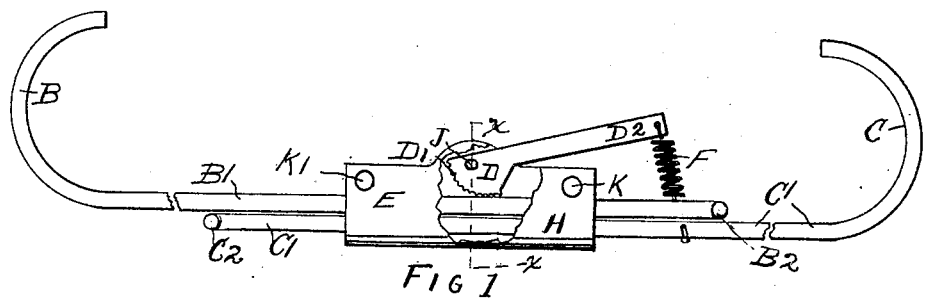
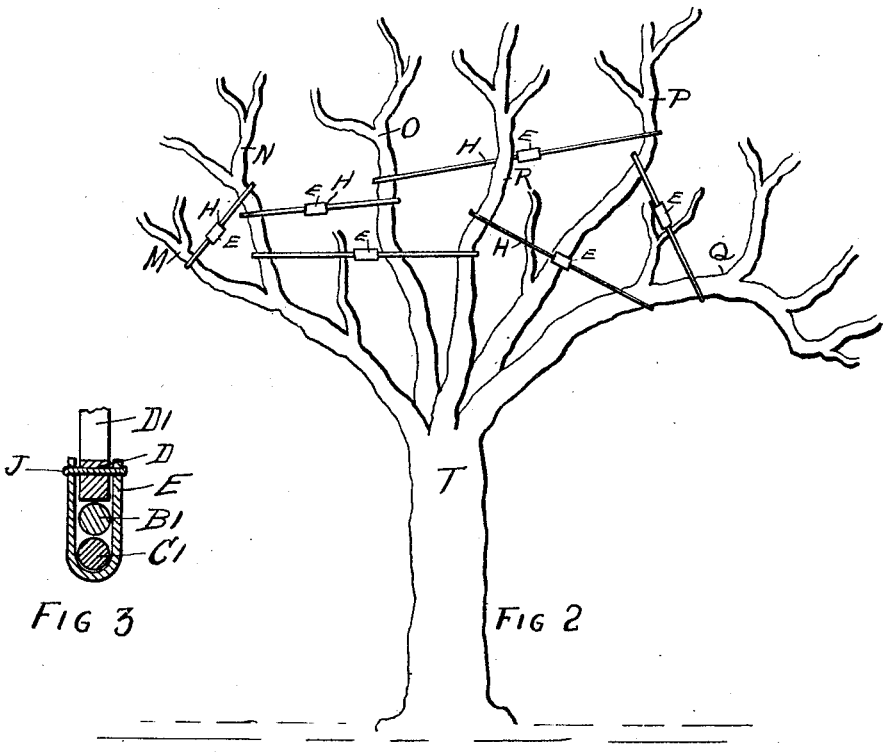
George Bosmajian
INVENTOR.
BY
Francis C. Huebner
ATTORNEY.

UNITED STATES PATENT OFFICE.

GEORGE BOSMAJIAN, OF FRESNO, CALIFORNIA.

TREE-LIMB SUPPORT.

1,389,932.  Specification of Letters Patent.  Patented Sept. 6, 1921.

Application filed August 23, 1920. Serial No. 405,319.

*To all whom it may concern:*

Be it known that I, GEORGE BOSMAJIAN, a citizen of the United States, and resident of Fresno, in the county of Fresno and the State of California, have invented a new and useful Improvement in Tree-Limb Supports, of which the following is a specification.

My invention relates to tree limb supports. It is well known by those familiar with the fruit industry, and especially raising fruits produced on trees in California, that frequently the trees overbear, and become so ladened with fruit that the limbs break off, thus permanently injuring or destroying the trees. It is now the practice in fruit orchards to use wooden props which are placed endwise on the ground under the trees, the upper end of the prop being designed to support a limb. The use of such props are objectionable because of the expense in securing them, the labor necessary to put them to use and to collect them when the crop is gathered, because when in use it is difficult to plow or cultivate the trees or to drive a truck or vehicle near to the tree to gather the fruit therefrom on account of the props surrounding the tree and when they are hit with a tool or vehicle they break readily.

The object of my invention is to produce a support for the limbs of the tree which will be light in weight, which can be readily adjusted to the length desired for use as hereinafter set forth, and which will effectually make the tree limbs support each other and hold them erect, and will in no way interfere with the cultivation of the soil under the tree or with trucks or vehicles which are necessary to drive under the trees.

I accomplish these and other objects hereinafter disclosed by means of the invention hereinafter described and illustrated on the accompanying drawings in which Figure 1 is a view of the device complete, with parts broken away for the purpose of showing the clamp for fastening the two parts of the support together. Fig. 2 is the outline of a tree in which the branches are tied together with the supports hereinafter described. Fig. 3 is a sectional view of the clamping frame along the line $x$—$x$ on Fig. 1. In said drawing B and C are duplicate hooks formed preferably of strong, stiff wire or rods, having stems $B^1$ and $C^1$ which terminate at the ends opposite the hooks with a bent portion $B^2$ and $C^2$. E is a clamping frame which is constructed in the form of a box with two opposite ends removed. The inside width across the open ends of the box equals the diameter of the wire or rods forming the hooks. D is an eccentric pivoted to the clamping frame, at pivot J, and having an under corrugated edge $D^1$, and an upwardly extending handle $D^2$. This eccentric is formed so that when the handle $D^2$ stands upright, the rods $B^1$ and $C^1$ can easily slide within the clamping frame, and when the eccentric is turned with the larger portion toward the rods, the corrugated portions engage with the rods $B^1$ and $C^1$ and hold them rigidly together, and any endwise strain on the said rods will tend to make the clamp grip them tighter together and to hold them more rigid. F is a spring which is used to assist in holding the eccentric D in a position so that it will clamp the rods $B^1$ and $C^1$ together. The bent down portions $B^2$ and $C^2$ are intended to limit the length to which the combined hooks B and C can be extended. K and $K^1$ are rivets for holding frame E together. The entire assembled support is designated as H. T is a tree having some of its branches tied together with the support H.

In using this device it is proposed to attach two limbs of tree T together with one of said hooks by adjusting the hooks B and C such distance apart as is necessary to draw the limbs to which they are attached slightly toward each other. Thus a weak limb can be by this means attached to a heavy limb as the limbs indicated in the drawing as M and N, or in case there are a number of limbs around the tree which need supporting, a plurality of the supports can be used to attach the selected limbs together so that the supports will form a circle around the tree as shown in Fig. 2 by the supports H connecting the branches N, O, P, Q, R and N. It will be noted that this plan ties the limbs in an endless combination. By this means the weight of the heavily ladened boughs on the one side of the tree will balance the weight on the limbs on the opposite side of the tree and the arrangement tends to keep the limbs from breaking.

The form of clamp for attaching the rods together shown is one of many kinds which may be used, and I do not want my device limited by the form of clamp shown.

I claim as new and ask for Letters Patent:

1. In a device for supporting the limbs of a tree, the combination of two hooks having extensions thereto, and means for clamping said extensions together at any selective place between the ends of said extensions.

2. In a device of the character described, the combination of two rods, each of which terminate at one end in the approximate shape of a hook, a clamping frame consisting of a box open at two opposite ends, the open ends of said box being wide enough to admit said rods, and an eccentric member adapted to normally permit the rods to slide freely within said box, and arranged so that by turning the larger end of said eccentric toward the rods said rods will be clamped against the bottom of said box and rigidly held together.

GEORGE BOSMAJIAN.

Witnesses:
CLEO K. CURTIS,
H. A. HUEBNER.